Oct. 11, 1966  H. H. BORUP  3,278,355
PROCESS OF MAKING AN ARTICLE OF BALANCE CONSTRUCTION
Filed Sept. 12, 1963
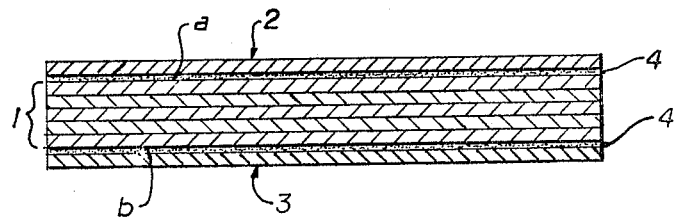
FIG_1
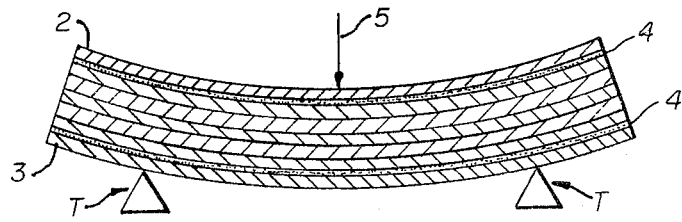
FIG_2
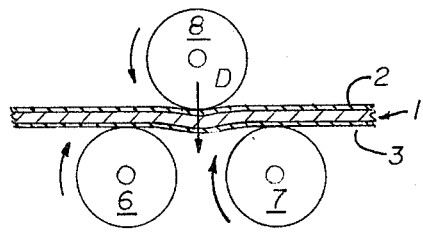
FIG_3
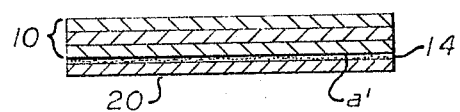
FIG_4
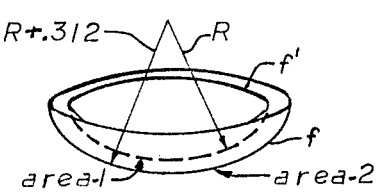
FIG_6
FIG_5
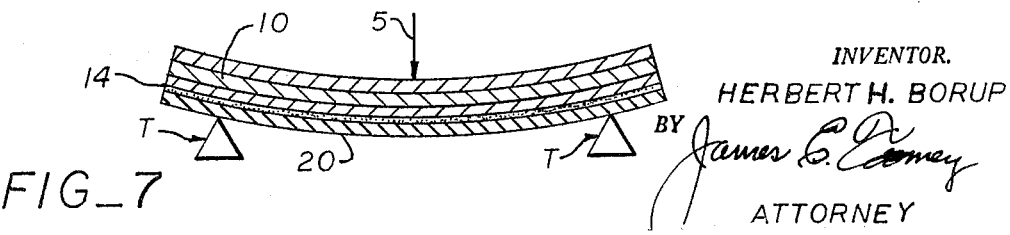
FIG_7
*INVENTOR.*
HERBERT H. BORUP
BY James E. Cooney
ATTORNEY United States Patent Office 3,278,355
Patented Oct. 11, 1966

3,278,355
PROCESS OF MAKING AN ARTICLE OF BALANCE CONSTRUCTION
Herbert H. Borup, Concord, Calif., assignor to Kaiser Aluminum & Chemical Corporation, Oakland, Calif., a corporation of Delaware
Filed Sept. 12, 1963, Ser. No. 308,575
4 Claims. (Cl. 156—229)

This invention relates to a process of manufacturing a laminated composite article of balanced construction and predetermined configuration and the product thereof. More particularly, it relates to a method of laminating or producing a composite panel which, after manufacture, will maintain a planar or predetermined arcuate configuration. This application is a continuation-in-part of my previously filed application Serial No. 234,989 filed November 2, 1962, now Patent 3,127,304 which application Serial No. 234,989 is also a continuation-in-part of my previously filed applications Serial No. 106,275 filed April 28, 1961 (now abandoned) and Serial No. 202,218, filed June 13, 1962 (now abandoned). This disclosure will specifically relate the invention with regard to panel production. However, it will be apparent that it may be readily applied to laminated articles of other than panel form.

A composite panel can be so constructed whereby it has one or more metal members attached to a suitable core so that either one or both sides of the core have a metal covering with the metal members being bonded to the core by means of a heat-sensitive adhesive or glue. However, as the metal members and the core usually have different coefficients of thermal expansion, it is found that the heating and cooling steps of the bonding process produce in the various components of the panel non-uniform dimensional movement, i.e., they will expand and contract in different amounts. As a result, stresses are developed in the various components of the panel such that unbalanced forces exist between opposing faces of the core and the metal members and the panel will undesirably warp or bow until these forces become balanced and a final state of equilibrium has been reached. Such a warped or bowed panel, however, can have an undesirable configuration.

When metal members or skins are bonded to opposing major faces of a suitable core and are made to exert or apply substantially equal or balanced forces to such opposing faces in a controlled fashion after the heating and cooling steps of the bonding process have been performed, the desired final configuration of the panel will be substantially flat or curved when the final state of equilibrium has been reached. In my prior Patent 3,127,-304, an advantageous arrangement for effecting this equilibrium is disclosed. A panel of the type set forth in my prior application can have a substantially flat configuration due to control of the stresses induced in the metal members as a result of the tendency of the metal members to contract during cooling in different amounts from the core material, which can be plywood, by virtue of the different coefficients of expansion and contraction of the core material and the differing metal coverings. Whereas, in my prior application, the control of stresses and the balancing of the forces applied to opposing faces of a suitable force-responsive core were primarily effected by the selection and use of metal overlays or coverings having unique structural and functional relationships as regards thickness and tensile yield strengths whereby the resultant configuration of the panel could be effectively controlled, I have found that substantially similar advantageous results can also be obtained by a positive and controlled deformation or stress relief of the metal overlays alone without reliance primarily upon preselected relationships of thickness and tensile yield strengths between the metal overlays.

Moreover, whereas, in my previous application, a certain amount of controlled stress relief of the type under consideration was considered advantageous as a secondary or supplemental step for effecting the final balancing of opposing forces applied to the core, I have found that it can be relied on as the primary or principal means for effecting the desired balancing of forces in the final composite panel. The teachings of the instant invention can be advantageously employed in situations where a metal overlay or covering is applied to only one major face of a suitable force-responsive core.

Sheet metal facing members are thermally responsive and will expand when heated and contract when allowed to cool. The extent to which a metal member will expand when heated is related to the coefficient of expansion of the metal member and to the temperature to which it is heated. If, however, a heated metal member is held in restraint in its thermally expanded condition such as by being anchored to a suitable core so that upon cooling the metal member is not permitted to contract or have unrestrained dimensional movement, internal stresses will develop in the metal. When the magnitude of the restraining force exerted on the metal exceeds the metal's tensile yield strength, permanent deformation of the metal member will begin, and the force which the metal member can exert on the core for all practical purposes becomes constant or fixed. In the case of the hot bonding of metal laminates to a force-responsive core, internal stresses are developed in a laminate as a result of the laminate being first thermally expanded and then prevented from contracting (restoration to its original dimensions) upon cooling.

In the hot-bonding manufacture of composite laminated articles, such as a panel comprised of a plywood core having metal coverings or overlays applied to the opposing major faces thereof, the metal members are prevented from contracting upon cooling by having been firmly or non-shiftably bonded or anchored in the thermally expanded condition to the core by a non-elastic thermo-reactive adhesive or glue. In hot bonding, it is common practice to use temperatures substantially above ambient temperature to obtain setting or curing of a thermo-reactive adhesive or glue. As noted in my previous Patent 3,127,304, such temperatures may be 50°–75° F. or greater above ambient temperatures. The application of a restraining force upon the metal claddings upon cooling due to the setting of the thermo-reactive adhesive can on occasion result in the imbalance of forces of the composite metal-clad panel components and, consequently, in undesirable changes in configuration due to the high uncontrolled stresses normally developed or induced in the metal facings. However, in accordance with my prior invention, if the development of these internal stresses in the metal facings is so controlled that the forces exerted by the metal overlays or facings on the core are balanced in a predetermined manner, a panel having a desired configuration, planar or curved at ambient temperature, can be produced.

This controlled balance of forces is effected in accordance with the present invention by a controlled stress relieving of the metal members or overlays. By being able to stress relieve one or more of the metal overlays in a controlled fashion such that the final forces applied by one overlay or facing to a core is substantially equal to that of the opposing overlay or facing, the overlays can have the same or different thicknesses and the same or different tensile yield strengths. In other words, it is not always necessary to control within selected limits the specific metallurgical characteristics of the overlays since the selected stress relieving of the material of the overlays can be used as the primary or principal means for effecting controlled stressing of the overlays and in turn suitable balancing of the forces applied to the force-responsive core material by opposing overlays after hot bonding of the overlays to the core is completed. In the case of a singly faced panel, stress relief and force balancing is accomplished in the single metal face relative to the core alone.

The various purposes and advantages of the instant invention will be more apparent from a review of the following detailed description when taken in conjunction with the accompanying drawing, throughout which like reference characters indicate like parts, and wherein FIG. 1 is a cross-sectional view of a doubly faced panel made in accordance with this invention;

FIG. 2 is a schematic view of one mode for balancing the forces ultimately applied upon cooling to opposing faces of a hot-bonded panel of the instant invention by stress relieving one of the metal facings or skins;

FIG. 3 is a schematic view of another mode for balancing the forces applied to a panel by the facings or overlays;

FIG. 4 is a cross-sectional view of a singly faced balanced panel constructed in accordance with the instant invention;

FIG. 5 is an elevational sectional view of a further embodiment of the instant invention;

FIG. 6 is a schematic view of the manner in which a composite panel can be deformed or bent to effect a stress relief in one of the metal coverings therefor; and FIG. 7 is a cross-sectional view of a singly faced FIG. 4 panel in accordance with this invention schematically showing the force-balancing, stress-relieving operation.

FIG. 1 illustrates a composite doubly faced panel made in accordance with the instant invention. It comprises, for example, a force-responsive plywood core 1 having affixed to the opposing major faces $a$ and $b$ thereof metal coverings or overlays 2 and 3. As used throughout this specification, "force-responsive core" refers to a core which although made of rigid, non-collapsible, materials having the structural strength and flexibility characteristics required for the core to respond by flexing to forces applied at the major faces thereof by a non-shiftably bonded metal overlay secured thereto under conditions of elevated temperature and pressure wherein the metal overlay was in a thermally expanded condition upon the occurrence of the bond.

Suitable heat-reactive glues or adhesives 4 provide the conventional glue lines for securing the overlays 2 and 3 to the core 1. Any heat-reactive adhesive or glue that produces a substantially non-elastic or non-shiftable glue line allowing core and overlay to be bonded in an inter-force transmitting relationship is satisfactory. Stated another way, the glue should effect such an adherence of the core and overlays whereby the final product will act as a composite section when subjected to loads during use. An adhesive bonding material which has been found suitable is a thermosetting continuous film of phenol-formaldehyde resin supported on a cellulosic carrier, and which sets at elevated temperatures of between 250°–325° F.

The overlays 2 and 3 can have similar tensile yield strengths but different relative thicknesses. Ordinarily, different unbalanced forces are applied to the opposing faces $a$ and $b$ of the core 1 by metal members of different relative thicknesses but similar tensile yield strengths whereby a warped or bowed panel results. The reason for this is that the force applied by a metal member on the core is proportional to the stress and the thickness of the metal member. This is shown as follows: Where "F" represents the force exerted on a core by a metal member upon cooling, "A" is the cross-sectional area of the metal member, "s" is the stress in the metal member, "l" is the length of the metal member, and "t" is the thickness of the metal member $$F=sA$$
$$A=lt$$
$$\therefore F=slt$$
$$\therefore F \alpha t$$

Also, if $F_1=F_2$
$$s_1 l_1 t_1 = s_2 l_2 t_2$$
But as $l_1 = l_2$
$$\therefore s_1 t_1 = s_2 t_2$$

∴, in order to have the forces balanced in a composite panel having a predetermined configuration, the ratio of the stresses ordinarily must be equal to the inverse ratio of the thicknesses. However, by stress relieving or stretching the thicker metal member beyond its tensile yield strength, such as member 3 in FIG. 1, in accordance with the instant invention whereby equal or balanced forces will be applied to the opposing major faces of the panel by each of the metal coverings or overlays, the panel can be made to assume the desired and substantially flat configuration of FIG. 1. Similarly, where a non-planar panel is sought, the desired configuration may be concavo-convex in cross section and be obtained according to the teachings of this invention.

Various arrangements can be employed for stress relieving one or both of the metal overlays 2 and 3 applied to core 1. As indicated in FIG. 2, the panel of FIG. 1 having a first metal member 3 and a second relatively thinner metal member 2 bonded to plywood core 1 by glue lines 4 of the type described above, can be advantageously supported during cooling adjacent opposing marginal edges by means of schematically indicated supports T, T disposed under the first metal member 3. The panel is then subjected to an external force 5, indicated by a force arrow, from the other side. In one embodiment, weights or levers may be used to exert force 5 in a direction substantially normal to the panel face at the point where such force is applied. The force applied, either longitudinal or transverse or both, to the panel is of a magnitude sufficient to stress relieve or stretch the thicker metal member 3 beyond its tensile yield strength or to the point where the stresses normally induced in member 3 upon cooling as it tries to contract will be so related to similar stresses induced in member 2 as it also tries to contract during cooling whereby the forces applied by each of the metal overlays 2 and 3 to core 1 will be substantially equal. When a plywood core is used as in the above example which has unequal bending and flexure resistance in different directions, it is preferable in producing a metal covered plywood core panel having the desired configuration to deflect the panel in at least two directions, i.e., first in a direction that parallels the grain of one of the plywood veneers and then in the direction parallelling the grain of another plywood veneer said latter grain being disposed substantially transverse to said first grain.

The aforesaid stress relieving can be further demonstrated by reference to FIG. 6 and the following examples which illustrate the amount of deflection necessary to achieve a substantially flat, balanced panel of 5/16" overall thickness using various thicknesses of metal skins or overlays, the metal skins being made of standard aluminum alloys as designated and the optimum mode of deflecting such a panel. In these examples, the following assumptions are to be made:

(1) Core does not take a set when deflected.
(2) Temperature drop from bonding to ambient temperatures cause metal overlay skins to be stressed beyond the tensile yield strengths of each skin.
(3) Metal has a substantially equal section modulus in every direction.
(4) Unbalanced forces cause panel to assume a generally spherical configuration at ambient temperatures, i.e., panel is spherically bowed.

(5) The force-responsive core is substantially homogeneous, i.e., has equal strength (bending and flexure resistance) in all directions such as a hard-board core.

The undesirably bowed panels must be forceably deflected into a spherical configuration to elongate or stretch the metal skin which applies the greater total force upon the panel in the flat state. With the proper elongation, the greater skin force will be reduced by an amount which makes it equal to the lower force in the second face, thereby giving a balanced panel a flat configuration.

*Example I*

| Aluminum Alloy | Tensile Yield Strength, p.s.i. | Thickness | Skin Load, lbs./linear inch |
|---|---|---|---|
| Bottom face 5050-H22 | 16,000 | .020 | 320 |
| Top face 5050-0 | 8,000 | .020 | 160 |

For the purpose of these examples, the skin load is defined as the force or load applied to the respective sides of the core by each skin when the panel is restrained in a flat configuration. It is recognized that the skin producing the lower force (skin load) will be slightly under its tensile yield strength when the panel is restrained in the flat configuration. The amount of reduced tension can be calculated after measuring the radius of curvature in the unrestrained condition.

*Tensile yield strength* is the stress at which a material exhibits a specific permanent set due to tensile forces.

*Stress* is the force per unit area within a body which resists a change in shape.

By use of the previously described equation, it is understood that to achieve equal total forces, bottom face $f$ of FIG. 6 must be elongated so that in a flat configuration, the tensile yield strength is reduced from 16,000 p.s.i. (tensile yield strength) to 8,000 p.s.i. (tensile yield strength).

By use of the equation noted below, one arrives at the elongation required to give the metal skin of the bottom face $f$ the necessary stress relief.

$$\Delta = \frac{P}{A}\frac{l}{E}$$

$$= 8{,}000 \frac{1}{10 \times 10^6} = .0008 \text{ in. per in.}$$

$\Delta$ = elongation in inches
$P/A$ = stress p.s.i. (tensile yield strength)
$l$ = length (1") in.
$E$ = Young's Modulus ($10 \times 10^6$ for aluminum) p.s.i.

Once having determined the amount of elongation necessary to stress relieve the member, the following equation can be used to determine the shape of curvature required to produce a flat panel. By reference to FIG. 6 which schematically shows a composite panel deflected into a spherical shape, it will be observed that Area₂ is the area of the metal skin $f$ which requires stress relief, e.g., bottom face of Example I. Since the elongation of any segment on the sphere for Area₂ which represents bottom face of Example I is equal to the square root of Area₂ minus the square root of Area₁ which represents top face $f'$ of Example I divided by the square root of Area₁, thus $$\text{Area}_2 = 4\pi(R+.312^*)^2$$
$$\text{Area}_1 = 4\pi R^2$$

$$\text{Elongation} = \frac{\sqrt{\text{Area}_2} - \sqrt{\text{Area}_1}}{\sqrt{\text{Area}_1}}$$

$$= \frac{2\sqrt{\pi}(R+.312) - 2\sqrt{\pi}R}{\sqrt{\pi}R}$$

$$= \frac{.312''}{R}$$

---
* 5/16" thick panel.

Elongation = .0008 = .312"/$R$
$R$ (radius of curvature) = 390" or 32½ ft.

By using the same formulas, the radius of curvature or deflection can easily be found in the following examples:

*Example II*

| Alloy | Tensile Yield Strength, p.s.i. | Thickness | Skin Load, lbs./ linear inch | Radius of Curvature, ft. |
|---|---|---|---|---|
| Bottom, 5050-H22 | 16,000 | .020 | 320 | |
| Top, 5050-0 | 8,000 | .010 | 80 | 21.61 |

*Example III*

| Alloy | Tensile Yield Strength, p.s.i. | Thickness | Skin Load, lbs./ linear inch | Radius of Curvature, ft. |
|---|---|---|---|---|
| Bottom, 1100-H12 | 15,000 | .010 | 150 | |
| Top, 5005-H32 | 20,000 | .002 | 40 | 23.81 |

It is to be understood that in the aluminum industry the dividing line between sheet and foil is .006". Thus, aluminum and aluminum alloy materials having a gauge thickness of .006" and above are considered to be "sheet" and aluminum and aluminum alloy materials having a thickness below .006" are considered to be "foil."

A second arrangement for stress relieving one of the metal members, such as the metal member 3 of the article shown in FIG. 2, is to pass a finished composite article through a series of rollers 6, 7 and 8, as shown in FIG. 3. The upper force roller 8, which is arranged in mating or intermediate relationship with force-resisting rollers 6 and 7, is movable in a vertical plane and exerts a downward force or deforming pressure in the direction of the arrow D. Roller 8, which can be applied either to a fully or partially cooled composite or laminated panel depending on the results desired, acts to effect an elongation or stretching of the metal skin or covering 3 in the amount required to relieve the stress buildup in covering 3, and thus selectively establish the final requisite force that covering 3 is to apply to the core in order to achieve the balance of forces between core and coverings 2 and 3 that is required to produce the desired panel configuration. In order to stress relieve the metal skin the desied amount, it is to be understood of course that the panel can be passed through the rollers more than once, the first pass being made in a direction paralleling the grain of one of the plywood veneers and a second pass, for example, being made in a direction paralleling the grain of another plywood veneer in the fashion noted above with respect to deflecting metal clad plywood cores.

FIG. 4 illustrates another embodiment of the invention wherein a single surface $a'$ of a force-responsive core 10, such as plywood, is provided with metal covering 20 nonshiftably bonded thereto by a thermo-active adhesive or glue 14. The composite panel has been stress relieved in accordance with the instant invention in that the internal stresses developed in the metal covering or overlay 20, upon cooling of the laminate to ambient temperatures, result in forces applied to the core which equate the responding forces of the core applied to the overlay as a result of internal stresses developed in the core and with the panel having a desired planar configuration. Stress relieving of the panel of FIG. 4 is shown in FIG. 7 wherein the panel is placed on supports T, T and pressure is applied by force 5 in the manner previously described.

FIG. 5 illustrates a further application of this invention to a composite article. The composite article shown in FIG. 5 is advantageously comprised of a suitable force-responsive plywood core 31 to the opposing sides of which overlays or coverings 32 and 33 have been applied. One of these overlays, such as overlay 32, may be metal while overlay 33 may be of a non-metallic material, such as high, medium or low density layer of resin-impregnated paper, hardboard, a reintegrated fiberboard, or a compressed resin-fused fibrous overlay mat, or another suitable non-metallic material used as a decorative overlay. In this instance, the metallic overlay 32 is stress relieved in accordance with the instant invention in order to balance the forces applied to the opposing sides of the core by the metallic and non-metallic overlays. This, of course, assumes that the coefficient of expansion of the metal overlay 32 is higher than that of non-metallic layer 33.

It is within the scope of this invention, if desired, to provide a panel with a predetermined bow, in which event the methods shown in FIGS. 2 and 3 can be advantageously used and/or metal members may be employed which will impart a predetermined bow because the forces exerted between the core and the metal members are deliberately designed to be unbalanced.

While the particular examples set forth refer to the use of aluminum or aluminum alloy metal members and plywood or homogeneous cores, such as hardboard cores, it is, of course, obvious that other materials can be used for both the metal skin members and/or the core. For example, suitable force-responsive honeycomb, asbestos and plastic cores may be overlaid with stainless steel, aluminum and other skin materials. By this method panels can be provided for use in the building trades and in the construction of shipping containers, boats and the like, in general, wherever a strong composite panel might be desirable. The opposed metal members of a doubly overlaid panel may of course also be of quite different materials. While organic thermo-setting adhesives, such as phenol-formaldehyde resins on cellulosic carriers, have been used satisfactorily, other suitable thermo-reactive bonding materials, such as modified in elastic, epoxy resins and neoprene phenolics, are likewise useful to provide rigid, non-shiftable or non-elastic glue lines between the overlays and a force-responsive core with satisfactory results.

The thicknesses of the various parts shown in the drawing and described herein are merely schematic and are not to scale. While the present invention has been shown in a few forms only, it will be obvious to those skilled in the art that other forms are readily producible and that various changes and modifications may be made in all forms according to this invention without departing from the spirit and scope thereof, as set forth in the appended claims, wherein—

What is claimed is:

1. The process of manufacturing a composite laminated article of predetermined configuration, consisting essentially of the steps of selecting a metal covering member and a force-responsive core; interposing a thermo-reactive glue line between a major face of said force-responsive core and said metal covering member; subjecting the assemblage of said metal covering member, core and glue line to the substantially simultaneous application of heat and pressure (a) to thermally react said glue line, (b) to expand said metal covering member relative to said core, and (c) to non-shiftably bond said metal covering member to said core in an interforce transmitting relationship while said metal covering member is in an expanded condition; and then, without materially affecting said bond, deflecting said metal covering member and said core in such a manner as to stretch the metal covering member to relieve the internal stresses normally induced therein as said metal covering member tends to contract upon cooling, the deflecting and stretching of said metal covering member being the primary means for effecting and being in an amount sufficient to effect the desired balance between the force applied to the core by the metal covering member and vice versa to thereby cause said assemblage to finally assume and maintain said predetermined configuration.

2. The process as set forth in claim 1 wherein the stress relieving of the metal covering member is effected by first deflecting the assemblage in one direction and then in a different direction so as to elongate and stress relieve the metal covering member in a plurality of directions.

3. The process of manufacturing a composite laminated article of predetermined configuration, consisting essentially of the steps of assembling a sandwich including a force-responsive core and a pair of opposed metal covering members each extending over and juxtaposed to oppose a separate major face of said core; interposing a thermo-reactive glue line between each major face of said core and the adjacent metal covering member; subjecting the assemblage of metal covering members, core and glue lines to the substantially simultaneous application of heat and pressure (a) to thermally react said glue lines, (b) to expand said metal covering members relative to said core, and (c) to non-shiftably bond said metal covering members to said core in an interforce transmitting relationship and while said metal covering members are in an expanded condition and then, without materially affecting the bonds between the metal covering members and the core, deflecting the assemblage in such a fashion as to stretch at least one of said metal covering members to relieve the internal stresses normally induced therein as said last-mentioned metal covering member tends to contract upon cooling, the deflecting and stretching of said metal covering member being the principal means for effecting and being in an amount sufficient to effect the desired balance between the forces applied to the core by the respective metal covering members and vice versa to thereby cause said assemblage to finally assume and maintain a predetermined configuration.

4. The process as set forth in claim 3 wherein said stress relieving of the one metal covering member is effected by first deflecting the assemblage in one direction and then in a different direction so as to elongate and stress relieve the said metal covering member in a plurality of directions.

References Cited by the Examiner
UNITED STATES PATENTS

| | | | |
|---|---|---|---|
| 2,318,184 | 5/1943 | Rojas | 156—151 |
| 3,003,204 | 10/1961 | Bryant | 156—229 |
| 3,127,304 | 3/1964 | Borup | 161—56 |

ALEXANDER WYMAN, *Primary Examiner.*

W. J. VAN BALEN, *Examiner.*